(No Model.)
M. NOE.
HAME FASTENER.
No. 337,699. Patented Mar. 9, 1886.
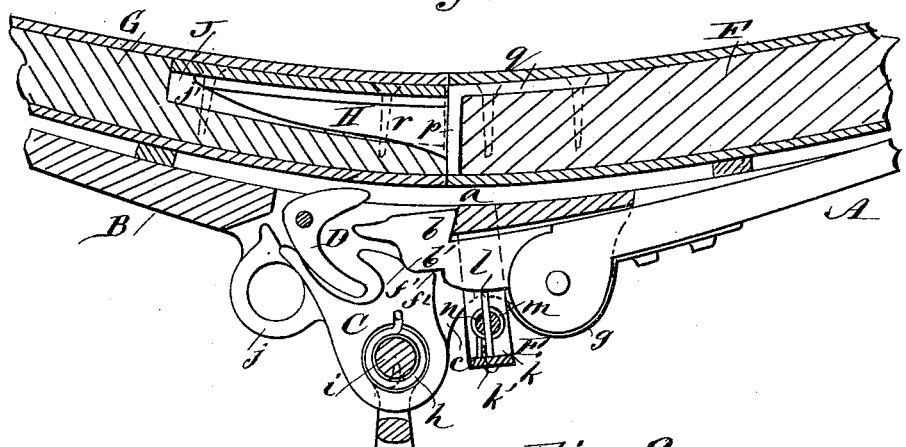
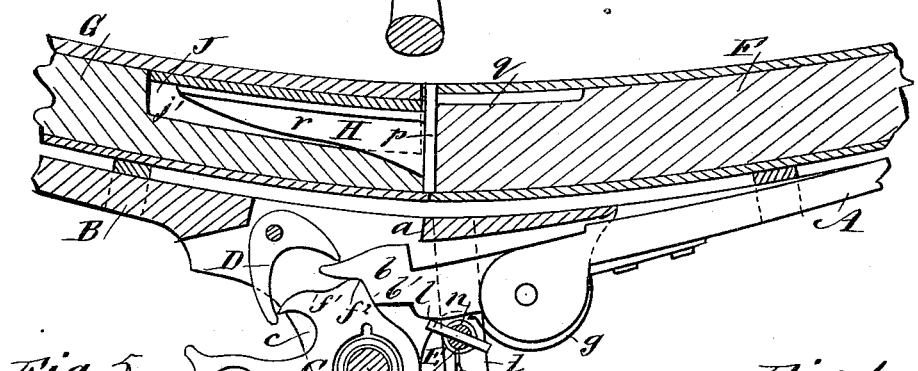
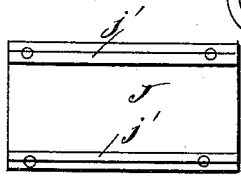
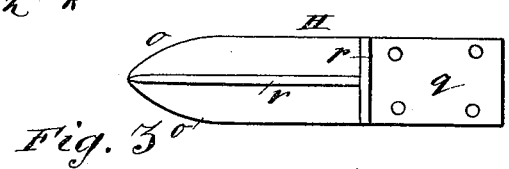
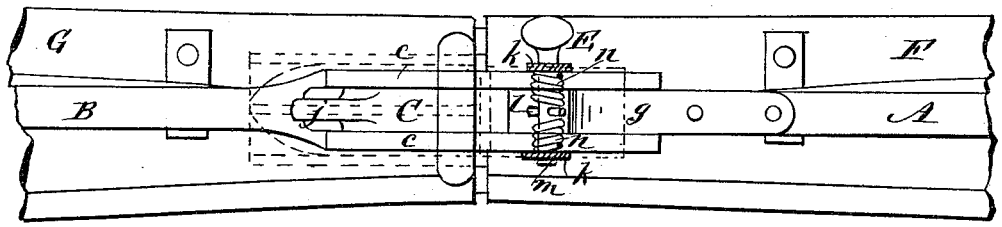
WITNESSES:
C. Neveux
C. Sedgwick
INVENTOR:
M. Noe
BY Munn & Co
ATTORNEYS.

UNITED STATES PATENT OFFICE.

MARSH NOE, OF DAVENPORT, IOWA.

HAME-FASTENER.

SPECIFICATION forming part of Letters Patent No. 337,699, dated March 9, 1886.

Application filed August 25, 1885. Serial No. 175,271. (No model.)

*To all whom it may concern:*

Be it known that I, MARSH NOE, of Davenport, in the county of Scott and State of Iowa, have invented a new and Improved Hame-Fastener, of which the following is a full, clear, and exact description.

My invention relates to certain improvements in my new hame-fastener covered by Letters Patent No. 291,390, which were granted to me January 1, 1884; and the invention consists of a special form of the tumbler and fastening-hook whereby they mutually lock each other when the hames are fastened together.

The invention also consists of a stop applied to the hook to avoid accidental unhooking of the hames, and of a tongue or guide applied to the lower ends of the collar to cause a proper registering of the collar and hames when brought together for fastening.

Reference is to be had to the accompanying drawings, forming part of this specification, in which similar letters of reference indicate corresponding parts in all the figures.

Figure 1 is a sectional elevation of the lower portion of a collar and hames having my invention applied thereto, the operative parts being shown in locked position. Fig. 2 is a similar view showing the parts in position to permit the hames and sections of the collar to be separated. Fig. 3 is an inverted plan view showing the collar and hames locked, the frame holding the stop being broken away to more clearly show the stop. Fig. 4 is a view of the tongue or guide detached from the collar, and Fig. 5 is a detached view of the socket for the guide.

The hame A is made fast to the section F of the collar, and is provided with the hook $b$, and the hame B is made fast to the section G of the collar, and is formed with the offset or notch $a$ and cheek-pieces $c\ c$, the same as in my above-mentioned patent. Between the cheek-pieces $c\ c$ are pivoted the tumbler C and dog D, the same as in said patent and for the same purpose; but the nose $f$ of the tumbler, instead of being made on a plain curve, as in said patent, is depressed or curved out at $f'$ to form the upwardly-projecting shoulder $f^2$, to form a lock with the hook $b$, which, instead of being made on a plain curve at its lower surface, as in said patent, is formed with a protuberance, $b'$, to fit in the depression $f'$ of the tumbler, as shown clearly in Fig. 1. The hook $b$ is held pressed upward by the flat spring $g$, and the tumbler C is normally held to the position shown in Fig. 1 by coiled spring $h$, placed on the bolt $i$, and the tumbler is formed with the projection $j$ for operating it, the same as in said patent.

In order to more effectually lock the hook $b$ in engagement with the notch $a$ than is accomplished by spring $g$ and tumbler C, I employ an additional stop, E, arranged below the hook in the frame or support $k$, attached to the outer end of the cheek-pieces $c\ c$. The stop proper is the pin $l$, passed through the pin $m$, journaled in the side pieces of the frame $k$, and a coiled spring, $n$, is placed upon the pin $m$ and secured to normally hold the pin $m$ turned to bring the pin $l$ to vertical position, in which position, when the hook $b$ is locked with the notch $a$, the pin stands immediately under the hook and effectually prevents it from dropping down away from the notch $a$, as will be understood from Fig. 1. The pin $m$ is flattened at one end, like a thumb-screw, for convenience in turning the pin to swing the stop-pin $l$ to horizontal position for permitting the hook $b$ to be released from the notch $a$ when the hames and collar are to be separated, and to prevent the spring $n$ from turning the pin $m$ too far, and to thus render the stop-pin $l$ uneffectual, I provide the frame $k$ with a stop, $k'$, (shown in Figs. 1 and 2,) against which the pin $l$ strikes, so that it can never get out of proper position. When the sections of the collar and the hames are separated and are to be brought together again for fastening, it is necessary that the hook $b$ accurately enter between the cheek-pieces $c\ c$, and for this purpose I provide the section F of the collar with a tongue or guide, H, of metal, to enter a corresponding socket, J, in the section G of the collar. The socket J is of metal and the guide H is brought to a rounded point with curved edges $o\ o$, which, if the guide strike the socket out of line, will deflect the sections of the collar laterally and bring them to proper alignment before the hook $b$ enters between the cheek-pieces $c\ c$, so there can be no failure of the hook to enter. The guide is formed with the upright portion $p$ and plate or tang $q$ to facilitate its secure attachment to the section F of the collar, and it is formed with the fin $r$ for strengthening it. The socket J is formed with the side pieces or flanges, $j'\ j'$, between which the guide fits.

In operation, for separating the hames and the sections of the collar, the stop E is turned to move the pin $l$ from under the hook $b$, and then the tumbler C is brought to the position shown in Fig. 1, which will tilt the dog D downward and cause it to force the hook $b$ below the notch $a$ to the position shown in Fig. 2, when the sections and hames are free to be parted. To fasten the hames and collar it is only necessary to bring them forcibly together, when the guide H will first enter the socket J, then the hook $b$ will enter between the cheek-pieces $c\ c$ and force the tumbler C backward until the hook passes the notch $a$, when the springs $g$, $n$, and $h$ will act to force the hook, the stop, and the tumbler to the positions shown in Fig. 1, effectually locking and securing the hames and sections of the collar together.

Having thus described my invention, what I claim as new, and desire to secure by Letters Patent, is—

1. In a hame-fastener such as described, the tumbler C, formed with the projection $f^2$, in combination with the hook $b$, formed with the protuberance $b'$, substantially as and for the purposes set forth.

2. The hame B, formed with the notch $a$, and provided with the pivoted locking-tumbler C, and the hame A, provided with the hinged locking-hook $b$, in combination with a stop arranged below the notch $a$ in frame or support $k$, for locking the hook $b$ in engagement with the notch $a$, substantially as described.

3. The hame B, formed with notch $a$, and provided with pivoted tumblers C, and downwardly-projecting frame $k$, in combination with the hame A, formed with the hinged hook $b$ and the spring-actuated rotating stop-shaft $m$, and stop-pin $l$, held in the frame $k$, for locking the hook $b$ into engagement with the notch $a$, substantially as described.

4. The hame A, secured to the section F of the collar, the hame B, made fast to the section G of the collar, and the automatic locking mechanism attached to the lower ends of the hames, in combination with the guide-tongue H, secured to the section F of the collar, and the socket J, secured in the section G of the collar, the guide-tongue H being of a length to reach past the automatic locking mechanism, whereby, when the sections of the collar and the hames are brought together, the tongue H acts as a guide in entering the socket J to cause the proper registering of the hames and the automatic locking mechanism, substantially as described.

MARSH NOE.

Witnesses:
H. C. FULTON,
M. D. SNYDER.